US006737486B2

(12) United States Patent
Wang

(10) Patent No.: US 6,737,486 B2
(45) Date of Patent: May 18, 2004

(54) POLYMERIZATION PROCESS

(75) Inventor: Jin-Shan Wang, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/195,971

(22) Filed: Jul. 16, 2002

(65) Prior Publication Data

US 2004/0014910 A1 Jan. 22, 2004

(51) Int. Cl.[7] .................................................. C08F 4/44
(52) U.S. Cl. ........................ 526/144; 526/348; 526/147; 526/161; 526/171; 526/173; 526/135; 502/339; 502/325; 502/334; 502/355
(58) Field of Search ................................ 526/348, 171, 526/173, 147, 161, 144, 135; 502/339, 325, 334, 355

(56) References Cited

U.S. PATENT DOCUMENTS

| | | | | |
|---|---|---|---|---|
| 4,201,877 A | * | 5/1980 | Yamazaki et al. | 568/720 |
| 5,759,950 A | * | 6/1998 | Gui et al. | 502/359 |
| 6,117,812 A | * | 9/2000 | Gao et al. | 502/159 |
| 6,310,165 B1 | * | 10/2001 | Wang | 526/348 |

OTHER PUBLICATIONS

Sawamoto, Trends Polym. Sci. 1, 1 1 1 (1993).*
Gaynor et al. Macromolecules 28, 8051 (1995).*
Reetz et al. Macromol. Rapid Commun. 17, 383 (1996).*
Porter et al J. Phys. Chem. B, 101, 11106, (1997).*
Liu et al Chem mater. 2001, 13, 2766–2758.*

* cited by examiner

Primary Examiner—Tatyana Zalukaeva
(74) Attorney, Agent, or Firm—Andrew J. Anderson

(57) ABSTRACT

A process for polymerization of vinyl monomers is described comprising polymerizing vinyl monomers in the presence of an initiating system comprising (i) an organic iodide, organic bromide, organic chloride, or an organic sulfur initiator compound, and (ii) a layered material catalyst, and wherein when the initiator compound comprises an organic bromide or organic chloride compound, the initiating system further comprises an iodide or sulfur containing salt compound or a transition metal salt. The present invention provides a novel method for living polymerization of vinyl monomers, which provides a high level of macromolecular control over the polymerization process and which leads to uniform and controllable polymeric products, which may include well-defined structures and complex architectures.

18 Claims, No Drawings

POLYMERIZATION PROCESS

FIELD OF THE INVENTION

The present invention relates to a novel process for living/controlled polymerization of vinyl monomers, particularly to use of a novel initiating system comprising an organic halide or an organic sulfur compound combined with a layered material catalyst for living/controlled polymerization of vinyl monomers.

BACKGROUND OF THE INVENTION

Conventional chain polymerization of vinyl monomers usually consists of three main elemental reaction steps: initiation, propagation, and termination. Initiation stage involves creation of an active center from an initiator. Propagation involves growth of the polymer chain by sequential addition of monomer to the active center. Termination (including irreversible chain transfer) refers to termination of the growth of the polymer chain. Owing to the presence of termination and poorly controlled transfer reactions, conventional chain polymerization typically yields a poorly controlled polymer in terms of predicted polymer properties. Moreover, conventional chain polymerization processes mostly result in polymers with simple architectures such as linear homopolymer and linear random copolymer.

In 1950s, a so-called living polymerization was discovered by Szwarc (Szwarc, et al. J. Am. Chem. Soc. 78, 2656 (1956)). Living polymerization was characterized by the absence of any kinds of termination or side reactions which might break propagation reactions. The most important feature of living polymerization is that one may control the polymerization process to design the molecular structural parameters of the polymer. Additional polymerization systems where the termination reactions are, while still present, negligible compared to propagation reaction have also been disclosed. As structural control can generally still be well achieved with such processes, they are thus often termed "living" or controlled polymerization (Wang, Macromolecules, 28, 7901 (1995)). In living and "living" (or controlled) polymerization, as only initiation and propagation mainly contribute to the formation of polymer, molecular weight can be predetermined by means of the ratio of consumed monomer to the concentration of the initiator used. The ratio of weight average molecular weight to number average molecular weight, i.e., molecular weight distribution (Mw/Mn), may accordingly be as low as 1.0. Moreover, polymers with specifically desired structures and architectures can be purposely produced. In terms of topology, such structures and architectures may include: linear, star, comb, hyperbranched, dendritic, cyclic, network, and the like. In terms of sequence/composition distribution such structures and architectures may include: homopolymer, random copolymer, block copolymer, graft copolymer, gradient copolymer, tapered copolymer, periodic copolymer, alternating copolymer, and the like. In terms of functionalization, such structures and architectures may include: telechlics, macromonomer, labeled polymer, and the like.

A number of living/"living" polymerization processes have been developed. Examples of these polymerization processes include: anionic polymerization (Szwarc, J. Am. Chem. Soc. 78, 2656 (1956)), cationic polymerization (Sawamoto, Trends Polym. Sci. 1, 111 (1993)), ring opening methathesis polymerization (Gillium and Grubbs, J. Am. Chem. Soc. 108, 733 (1986)), nitroxides-mediated stable radical polymerization (Solomon, U.S. Pat. No. 4,581,429 (1986), Georges, Macromolecules, 26, 2987 (1993)), Cobalt complexes-mediated radical polymerization (Wayland, J. Am. Chem. Soc. 116, 7943 (1994)), and transition metal catalyzed atom transfer radical polymerization (Wang, U.S. Pat. No. 5,763,548 (1998)).

Living/"living" polymerization processes have been successfully used to produce numerous specialty polymeric materials which have been found to be very useful in many applications. One example is the commercialization of styrenic thermoplastic elastomers such as styrene-b-butadiene-b-styrene triblock copolymers (SBS) by Shell chemicals and others. SBS is made by sequential anionic living polymerization of styrene and butadiene. However, except for living anionic polymerization of non-polar monomers such as styrene and dienes using alkyl lithium as an initiator, almost all of other living/"living" systems mentioned-above currently showed little promise for wide industrial commercialization, mainly due to high cost to industrially implement these processes. Thus, searching for practical living/"living" polymerization processes is a major challenge in the field of polymer chemistry and materials.

Organic halide compounds have been used as initiator in several "living" polymerization systems. Sawamoto et al used a series of mixtures of alkyl halide and Lewis acid as initiating system in "living" cationic polymerization of vinyl ether, isobutylene, and styrene (Sawamoto, Trends Polym. Sci. 1, 111 (1993)). However, these cationic polymerizations required very restricted conditions such as moisture and impurities free reaction systems. Ganyor et al disclosed that combination of certain alkyl iodide with conventional radical initiator such as AIBN induced a "living" polymerization of styrene, methyl methacrylate, and methyl acrylate (Gaynor et al. Macromolecules 28, 8051 (1995)). The discovery of transition metal catalyzed atom transfer radical polymerization (ATRP) by Wang et al represents a very important step towards practical "living" polymerization (Wang, J. Am. Chem. Soc., 117, 5614 (1995), and U.S. Pat. No. 5,763,548). Using alkyl halide as an initiator and transition metal species as a catalyst, ATRP not only works well with a very broad variety of important vinyl monomers but also provides much easier pathway towards a variety of polymers with various structure and architectures. However, the use of heavy transition metal salts or complexes requires multi-step purification of the resultant polymers. Moreover, heavy transition metal salts or complexes are often toxic and not environmentally friendly. These drawbacks limit the wide implementation of current version ATRP process in industrial production.

An initiating system comprising an alkyl halide and an onium salt has been also found to be effective in promoting "living" polymerization. Reetz (Reetz et al. Macromol. Rapid Commun. 17, 383 (1996)) disclosed that while neither diethyl or dimethyl iodomethylmalonate nor tetra-n-butylammonium iodide alone initiated the polymerization of methyl methacrylate (MMA), a "living" polymerization of MMA was achieved by using diethyl or dimethyl iodomethylmalonate/tetra-n-butylammonium iodide (1/1) as an initiating system in polar solvents. The controlled poly (methyl methacrylate) was obtained in the number-average molecular weight range of 2000 to 8000, with molecular weight distribution being fairly narrow (ratio of weight- to number-average molecular weights Mw/Mn 1.2–1.3). Although the underlying mechanism is still unclear, the onium salt used acts as a catalyst in this homogenous polymerization system. In comparison with other "living"

systems, the alkyl iodide/ammonium salt combined catalyst system disclosed by Reetz represents a simpler and cleaner one towards "living" polymerization. Due to the instability of iodide containing organic compounds, however, such process may not be commercially feasible, and it has been found that more stable alkyl chlorides or bromides alone are not reactive enough to react with onium salt to generate initiating species in chain polymerization.

Wang U.S. Pat. No. 6,306,995 discloses a process for polymerization of vinyl monomers comprising (a) forming an initiator comprising an organic iodide compound by reacting an initiator precursor comprising an organic bromide or chloride compound with an inorganic iodide salt under phase transfer catalysis in the presence of a phase transfer agent, and (b) polymerizing vinyl monomers in the presence of the formed initiator and a polymerization catalyst comprising an onium salt. Wang U.S. Pat. No. 6,310,165 discloses another process for polymerization of vinyl monomers comprising (a) forming an onium salt complex comprising a transition metal component by reacting an onium salt with a transition metal species, and (b) polymerizing vinyl monomers in the presence of the formed transition metal containing onium salt and an organic halide initiator compound.

Use of organic sulfur compounds is also known in living/controlled polymerization. Otsu et al. "Features of Living Radical polymerization of Vinyl Monomers in Homogeneous System Using N,N-Diethyldithiocarbamate Derivatives as Photoiniferters" Eur. Polym. J. 31, 67 (1995), e.g., reports that radical photopolymerization of vinyl monomers with some sulfur compounds containing an N,N-diethyldithiocarbamyl group as photoiniferters proceeds via a living radical polymerization mechanism. Rizzardo et al. "Synthesis of Defined Polymers by Reversible Addition-Fragmentation Chain Transfer: The RAFT Process", ACS, pp.278–96 (2000), discloses a radical polymerization process using a suitable thiocarbonylthio compound as an initiator and a typical radical initiator as a catalyst. The selection of particular sulfur compounds and/or reaction conditions, however, are described as being critical for such prior processes to function effectively.

Commonly assigned, concurrently filed, copending U.S. application Ser. No. 10/196,102 describes a polymerization initiating system comprising (i) an organic sulfur compound and (ii) an onium salt catalyst, which combination leads to a novel initiating system which enables polymerization to proceed in a "living" way, and which enables use of a wider variety of organic sulfur compounds as initiators than previously reported for living polymerization processes.

Phase-transfer catalysis, PTC, was first coined by Starks in 1971 (J. Am. Chem. Soc., 93, 195 (1971)). It has been widely and practically used in various preparative organic, organometallic and polymer chemistry. PTC is a technique for conducting reactions between two or more reagents in one or two or more phases, when reaction is inhibited because the reactants cannot easily come together and one reagent is not reactive enough towards another one. A "phase-transfer agent" is added to transfer one of the reagents to a location where it can conveniently and rapidly react with another reagent. Two types of phase transfer agents are found efficient: quaternary salts and certain chelating reagents such as crown ethers, cryptands, poly (ethylene glycol) and their derivatives.

Traditional fields of polymer chemistry like radical, anionic and condensation polymerizations, as well as chemical modification of polymers, have substantially benefited from the use of phase transfer catalysis (Starks, Phase-Transfer Catalysis, ACS Symposium Series 326, 1987). Much work has been reported, e.g., on the use of phase transfer catalysis in condensation polymerization for the synthesis of polyester, polysulfonates, polyphosphonates, polysulfones, polythioesters, polyamides, polycarbonate, etc (see: Percec, in Phase-Transfer, Chapter 9, Starks Ed., ACS Symposium Series, Vol. 326 (1987)). It was often noticed that, in the absence of catalyst, only low molecular weight condensation polymer was produced even after long periods of time, whereas with the presence of the onium catalyst, high molecular weight of polymer was achieved after relatively short periods of time.

Phase transfer catalysis has been also used in chain polymerization. Rasmussen and co-workers have disclosed that many free radical polymerizations of acrylic monomers can be conducted in two-phase systems using potassium persulfate and either crown ethers or quaternary ammonium salts as initiators (Rasmussen et al. in, Phase-Transfer Catalysis, ACS Symposium Series 326, Starks Ed., p 116, 1987). When transferred to the organic phase, persulfate performs far more efficiently as an initiator than conventional initiators such as azobisisobutyronitrile or benzoyl peroxide. Photopolymerization of methyl methacrylate with quaternized ammonium salt-potassium thiocyanate-$CCl_4$ was also reported (Shimada, S. Polym. J. 30, 152 (1998)). However, all disclosed polymerization processes under phase transfer conditions were not living or "living". The monomer conversion to polymer was often very low; molecular weight can not be controlled; and molecular weight distribution is very broad (Mw/Mn often more than 2).

Composites of organic polymers and inorganic layered materials at the nanometer particulate level have received attention in recent years (see, e.g., Vaia et al. MRS Bulletin, 394 (2001)). The importance of such composites is due to strong synergistic effects between the polymer and nanoelement (inorganic layered material). This may result in enhanced electrical, optical, mechanical, and thermal properties compared with conventional micro-composites. Layered materials include clays such as montmorillonite, which is composed of two silica tetrahedral sheets with a central alumina octahedral sheet. Various ionic or polar organic compounds can be intercalated in the interlayer through ion exchange or through solvation of cations. Lamellar aluminosilicates are known not only to provide a nanoscale host for molecular orientation but also to trigger spontaneous polymerization of some organic monomers and influence the structure of resultant polymers formed. Porter et al disclosed surface polymerization of organic monomers on Cu(II)-exchanged hectorite (J. Phys. Chem. B, 101, 11106, (1997)). Liu et al recently reported an intercalative spontaneous polymerization of 2-ethylnylpyridine within layered aluminosilicate such as montmorillonite (Chem Mater. 13, 2756 (2001)). None of the prior art, however, discloses a process using an inorganic layered material as a catalyst for living/controlled polymerization of vinyl monomers.

It would be desirable to provide a novel method for living polymerization of vinyl monomers which provides a high level of macromolecular control over the polymerization process and which leads to uniform and more controllable polymeric products, and which may be used to prepare polymers with well-defined structures and complex architectures. It would be especially desirable to provide such a living polymerization process with existing facility, and which enables the use of a wide variety of readily available starting materials and catalysts. It would further be desirable to provide a novel method for manufacturing nanocomposites comprising polymer and layered material through "in-situ" living polymerization.

SUMMARY OF THE INVENTION

In accordance with one embodiment of the invention, a process for polymerization of vinyl monomers is described comprising polymerizing vinyl monomers in the presence of an initiating system comprising (i) an organic iodide, organic bromide, organic chloride, or an organic sulfur initiator compound, and (ii) a layered material catalyst, and wherein when the initiator compound comprises an organic bromide or organic chloride compound, the initiating system further comprises an iodide or sulfur containing salt compound or a transition metal salt.

The present invention provides a novel method for living polymerization of vinyl monomers, which provides a high level of macromolecular control over the polymerization process and which leads to uniform and controllable polymeric products, which may include well-defined structures and complex architectures. Oil soluble monomers may be polymerized in organic solvent or water-organic two phase solvent systems, while water soluble monomers may be polymerized in water or water-organic two phase solvent systems.

DETAILED DESCRIPTION OF THE INVENTION

According to the present invention, a novel polymerization process is described for conducting polymerization of monomers, particularly "living" polymerization of alkenes, wherein a novel initiating system is provided for producing oligomers and polymers with controlled structure. In the context of the present invention, the term "living" refers to the ability to produce a product having one or more properties which are reasonably close to their predicted value. The polymerization is said to be "living" if the resulting number average molecular weight is close to the predicted molecular weight based on the ratio of the concentration of the consumed monomer to the one of the initiator; e.g., within an order of magnitude, preferably within a factor of five, more preferably within a factor of 3, and most preferably within a factor of two, and to produce a product having narrow molecular weight distribution as defined by the ratio of weight average molecular weight to number molecular weight (MWD); e.g., less than 10, preferably less than 2, more preferably less than 1.5, most preferably less than 1.3. Moreover, compared with conventional polymerization, the conversion of the monomer in "living" polymerization is higher, e.g., higher than 10%, preferably higher than 30%, more preferably higher than 50%, most preferably higher than 80%.

In the present invention, the polymerization initiating system comprises (i) an organic iodide, bromide, or chloride compound or an organic sulfur compound initiator and (ii) a layered material catalyst. Any organic iodide, bromide or chloride compound or organic sulfur compound which comprises a monomeric, oligomeric, or polymeric organic moiety may be used in the initiator system of the present invention, as each individual component employed in the initiating system is not required to be able to induce "living" polymerization as defined herein by itself, or in many instances even polymerization. However, the combination of an organic halide or an organic sulfur initiator compound and a layered material catalyst in accordance with the invention, and further an iodide or sulfur containing salt compound or a transition metal salt when the initiator compound comprises an organic bromide or organic chloride compound, leads to a novel initiating system which enables polymerization to proceed in a "living" way. Such combination thus enables use of a wider variety of organic halide and organic sulfur compounds as initiators than previously reported for living polymerization processes, and also enables improved control over the polymerization process, which may advantageously enable generation of well-defined polymeric structures and complex polymeric architectures. In the context of the present invention, polymers with well-defined structures and complex architectures refer to those such as described in U.S. Pat. No. 5,763,548 in terms of (i) topologies such as linear, star, cyclic, dendritic/hyperbranched, networking, comb, and the like; (ii) compositions on the backbone such as random, block, graft, gradient, and the like; and (iii) functionality such as chelics, telechelics, macromonomers, and the like.

In accordance with one embodiment of the invention, an organic halide compound of the formula R-X is employed as an intiator compound in the process of the invention, where R is any organic moiety and X is Cl, Br or I. Examples of organic halide compounds which may be used include but are not limited to ethyl 2-bromoisobutyrate, ethyl 2-iodoisobutyrate, diethyl 2-bromo-2-methylmalonate, diethyl 2-iodo-2-methylmalonate, 2-chloropropionitrile, 2-bromopropionitrile, 2-iodopropionitrile, 2-bromo-2-methylpropionic acid, 2-bromoisobutyrophone, ethyl trichloroacetate, 2-bromoisobutyryl bromide, 2-chloroisobutyryl chloride, α-bromo-α-methyl-γ-butyrolactone, p-toluenesulfonyl chloride and its substituted derivatives, 1,3-benzenedisulfonyl chloride, carbon tetrachloride, carbon tetrabromide, chloroacetonitrile, iodoacetonitrile, tribromoethanol, tribromoacetyl chloride, trichloroacetyl chloride, tribromoacetyl bromide, chloroform, 1-phenyl ethylchloride, 1-phenyl ethylbromide, 2-chloropropionic acid, 2-bromoisobutyric acid, 4-vinyl benzene sulfonyl chloride, vinyl benzenechloride, 2-chloroisobutyrophenone, and 2-bromoisobutyrophenone. For optimal reactivity, organic iodide compounds (either preformed or generated in situ as described below) are preferred organic halide initiator compounds. When the initiator compound comprises an organic bromide or organic chloride compound, the initiating system further comprises an iodide or sulfur containing salt compound or a transition metal salt to provide desired reactivity.

In accordance with another embodiment of the invention, an organic sulfur compound is employed as an initiator compound in the process of the invention. Such organic sulfur compound is preferably selected from compounds of the following formulae I, II, III or IV:

$$R^1\text{—S—}R^2 \tag{I}$$

$$R^1\text{—S—S—}R^2 \tag{II}$$

$$R^1\text{—C(=S)—S—}R^2 \tag{III}$$

$$R^1\text{—C(=S)—S—S—C(=S)—}R^2 \tag{IV}$$

where $R^1$ and $R^2$ are independently selected from the following group: substituted or non-substituted alkyl, substituted or non-substituted aryl, substituted or non-substituted cycloalkyl, hetero-atom containing substituted or non-substituted alkyl, hetero-atom containing substituted or non-substituted aryl, hetero-atom containing substituted or non-substituted cycloalkyl, $NR^3R^4$, $SR^5$, $OR^6$, $C(O)R^7$, or $C(O)OR^8$, where $R^3$, $R^4$, $R^5$, $R^6$, $R^7$ and $R^8$ are substituted or non-substituted alkyl, substituted or non-substituted aryl, substituted or non-substituted cycloalkyl, hetero-atom containing substituted or non-substituted alkyl, hetero-atom containing substituted or non-substituted aryl, or hetero-atom containing substituted or non-substituted cycloalkyl.

Specific examples of organic sulfur compounds which may be employed in the initiating system in the process of the invention include but are not limited to:

$(C_2H_5)_2NC(=S)-S-S-C(=S)N(C_2H_5)_2$ "tetraethylthiuram disulfide", $C_6H_5-S-C(O)CH_3$ "s-phenyl thioacetate", $(CH_3)_2C(-S-Ph)COOC_2H_5$, $(CH_3)_2C(-S-C(=S)OC_2H_5)COOC_2H_5$, $(CH_3)_2C(-S-C(=S)N(C_2H_5)_2)COOC_2H_5$.

In the present invention, the organic halide or organic sulfur compound employed as initiator may be a monomeric compound, or may be an oligomeric or polymeric compound with a halide or sulfur containing substitute being either an end group or a pending group or part of the backbone. Such oligomer or polymer compounds may be originated, e.g., from step or chain polymerization. Further, the organic halides or organic sulfur compounds may be those with multiple halide or sulfur-containing moieties. Examples include but are not limited to: linear poly(vinyl benzylchloride) where the number of chloride substituents is equal to the number-averaged monomeric repeating unit; $C(CH_2CH_2OC(O)CX_3)_4$ (where X=I, Cl, Br or sulfur containing moiety); and the like.

Other organic halides or organic sulfur compounds employed as initiator compounds in the present invention may also contain additional functional groups, such that the resulting polymers contain such additional functional groups. Examples of useful functional groups include but are not limited to: COOH, OH, vinylic, $NH_2$, epoxy, anhydride, and the like. The organic halides or organic sulfur compounds may also be themselves a monomer. Example of these monomers include but are not limited to: vinylbenzyl chloride, and $CH_2=C(CH_3)COOCH_2CH_2OC(O)C(CH_3)_2Br$.

Any modified or non-modified, natural or synthetic layered inorganic particulate material can be used as catalyst in the present invention. Examples of these layered materials include but are not limited to phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the layered materials named above. Other useful layered materials, particularly useful with anionic matrix polymers, are the layered double hydroxide clays or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be splayed with swelling agents, which expand their interlayer spacing. Such materials include chlorides such as $FeCl_3$, FeOCl, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4\text{-}2H_2O$, $CaPO_4CH_3-H_2O$, $MnHAsO_4-H_2O$, $Ag_6Mo_{10}O_{33}$ and the like. Preferred inorganic layered materials for the present invention include clays, especially smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred layered materials include montmorillonite, hectorite, and hydrotalcites, because of commercial availability of these materials.

The aforementioned layered materials can be natural or synthetic, for example, synthetic smectite layered materials. This distinction can influence the particle size and/or the level of associated impurities. Typically, synthetic layered materials are smaller in lateral dimension, and therefore possess smaller aspect ratio. However, synthetic layered materials are purer and are of narrower size distribution, compared to natural clays and may not require any further purification or separation.

In accordance with a preferred embodiment, either natural or synthetic clay may be modified with organic compound to form a so-called organoclay material for use as the layered material catalyst in the process of the present invention. The synthesis of organoclay can be carried out using known methods such as acid-base reaction, ion exchange reaction, and metathesis reaction. Organoclay materials can be preformed or generated in-situ as part of the process of the invention. For example, organoclays can be pre-formed by interacting the clay with suitable intercalants. These intercalants are typically but not limited to organic compounds, which are neutral or ionic. Useful neutral organic molecules include polar molecules such as amides, esters, lactams, nitriles, ureas, carbonates, phosphates, phosphonates, sulfates, sulfonates, nitro compounds, and the like. Useful ionic compounds could be any positively or negatively charged species such as organic salts and acid containing compounds. Onium ion modified organoclays have been found to be particularly suitable for the "living" polymerization processes of the invention. In the present invention, it is also possible to generate an organoclay in-situ. For example, adding the onium salt, tetra-n-butylammonium iodide, to sodium cloisite aqueous solution leads to the formation of tetra-n-butylammonium-modified cloisite organoclay and sodium iodide.

Use of additional additives may be further desirable in the present invention to enhance the degree of the control of living polymerization, particularly where an organic chloride or organic bromide compound is used as the initiator. In such instance, the following types of additives can preferably be used to promote "living" polymerization of alkenes.

First, any iodide or sulfur containing salt compounds can be used to react with an organic chloride or bromide compound with or without an additional phase transfer catalyst to form an organic iodide or organic sulfur compound in-situ as described in U.S. Pat. No. 6,306,995 and copending U.S. Ser. No. 10/196,102 referenced above. Examples of iodide and sulfur salts which may be used include but are not limited to NaI, KI, LiI, CsI, $CaI_2$, $Na[SC(=S)N(C_2H_5)_2]$, $K[SC(=S)OC_2H_5]$, $K[S-C_6H_5]$. The iodide or sulfur containing salt compound in such embodiment can be used in a total amount of 0.01 to 100 moles, preferably 0.1 to 10 moles, more preferably 0.2 to 5 moles, most preferably 0.4 to 3 moles per mole of the organic chloride or bromide compound. While the layered material itself may function as a phase transfer catalyst, particularly for organoclays already modified with an onium salt compound, additional catalyst may be added, selected, e.g., from any phase transfer catalysts set forth in Starks, et al. *Phase-Transfer Catalysis, Fundamentals, Applications, and Industrial Perspectives*, Chapman & Hall, New York, 1994, or other resources. In general, additional phase transfer catalysts which may be used include any onium salts as described below and chelating agents. Examples of chelating agents include but are not limited to polyethylene glycol and derivatives such as $HO(CH_2CH_2O)_nH$ (n=2–600), $RO(CH_2CH_2O)H$ where $R=C_1$ to $C_{13}$ alkyl groups, $N(CH_2CH_2OCH_2CH_2OCH_3)_3$, $N(CH_2CH_2OCH_2CH_2OH)_3$, crown ethers and cryptands such as 18-crown-5, 15-crown-5, dibenzo-18-crown-6, dicyclohexano-18-crown-6, Kryptand 211, Kryptand 222, Kryptand 221. Added phase transfer catalyst, when employed, can be used in a total amount of 0.01 to 100 moles, preferably 0.1 to 10 moles, more preferably 0.2 to 5 moles, most preferably 0.4 to 3 moles per mole of the organic chloride or bromide compound.

Second, any transition metal compound that is able to react with the layered material catalyst can be used in the present invention. The transition metal compound used can be of the formula MY, where M is a transition metal atom with a formal charge of from 0–7, and Y is one or more counter-anion or coordinative ligand. The transition metal M which may be selected, e.g., from the group consisting of Ag, Au, Cu, Co, Cr, Fe, Hg, Ir, Mo, Nb, Ni, Os, Pd, Pt, Re, Rh, Ru, Tb, Ta, V, W, and Zn. Counter-anions which may be used for Y may be selected, e.g., from those set forth for $X'^-$ above, and representative coordinative ligands may be, e.g., (CO), cyclopentadienyl, and cyclooctadiene. The transition metal compound in such embodiment preferably can be used in a total amount of 0.01 to 100 moles, more preferably 0.1 to 10 moles, per mole of the organic halide or organic sulfur compound.

Onium salts, such as described in U.S. Pat. No. 6,306,995 and copending U.S. Ser. No. 10/196,102 referenced above, can also be used as an additive in the initiating systems of the invention to promote "living" polymerization of alkenes. Various onium salts can be used in the present invention, such as any of the onium salts described in *Phase-Transfer Catalysis, Fundamentals, Applications, and Industrial Perspectives* (Starks, et al. Chapman & Hall, New York, 1994). Such onium salts can be selected from the group with the formula $W^+X'^-$ where $W^+$ is a salt cationic onium ion group containing $N^+$, $P^+$, $S^+$, $As^+$, or $Sb^+$ element, and $X'^-$ is a counter-anion. Onium salt counter-anion $X'^-$ and can be selected, e.g., from the group consisting of $Cl^-$, $Br^-$, $I^-$, $NO_3^-$, $NO_2^-$, $ClO_3^-$, $BrO_3^-$, $IO_3^-$, $ClO_4^-$, $MnO_4^-$, $ReO_4^-$, $IO_4^-$, $CrO_4^{-2}$, nolybdate, tungstate, vanadate, borate, $SO_4^{-2}$, $S^{-2}$, $S_2O_3^{-2}$, arsentite, arsenate, selenite, tellurite, $(CO_2^-)_2$, $CO_3^{-2}$, $F^-$, $CH_3CO_2^-$, $C_6H_5CO_2^-$, $SCN^-$, $MeSO_3^-$, $N_3^-$, $Br_3^-$, $OH^-$, $CN^-$, picrate, nitrate, acetate, sulfate. Onium salt compounds preferably can be used in a total amount of 0.01 to 100 moles, more preferably 0.1 to 10 moles, per mole of the organic halide or organic sulfur compound. Preferred examples of onium salt compounds which may be used include iodide containing onium salts such as tetra-n-butylammonium iodide (particularly for use with organic chloride and organic bromide initiators), which may interact with a natural clay layered material in situ to form an organoclay catalyst and sodium iodide. A polymerizable quaternized monomer or monomers (e.g., 2-(dimethylamino)ethyl methacrylate, methyl chloride quaternized salt, and the like) may also be employed in the process of the present invention.

In addition to "ordinary" onium salts and transition metal compounds as described above, onium salt complexes of the type described in U.S. Pat. No. 6,310,165 may be employed as additives in the process of the present invention. Such complexes can be selected from the group with the formula: $[MX'Y]^- W^+$, which results from reaction between an onium salt of the formula $W^+X'^-$ such as described above with a transition metal species of the formula MY such as described above.

In the present invention, any vinyl monomers can be polymerized and/or copolymerized in the presence of the above-described initiating system. The layered material/monomer weight ratio can be varied, e.g., from 0.01/99.99 to 99.99/0.01. Examples of monomers which may be polymerized in accordance with the present invention include but are not limited to: carboxyl group-containing unsaturated monomers such as acrylic acid, methacrylic acid, crotonic acid, itaconic acid, maleic acid, fumaric acid, and the like (preferably methacrylic acid), $C_{2-8}$ hydroxyl alkyl esters of (meth)acrylic acid (preferably methacrylic acid) such as 2-hydroxylethyl (meth)acrylate, 2-hydroxylpropyl (meth)acrylate, 3-hydroxypropyl (meth)acrylate, hydroxybutyl (meth)acrylate and the like, monomesters between a polyether polyol (e.g., polyethylene glycol, polypropylene glycol or polybutylene glycol) and an unsaturated carboxylic acid (preferably methacrylic acid); monoethers between a polyether polyol (e.g., polyethylene glycol, polypropylene glycol or polybutylene glycol) and a hydroxyl group-containing unsaturated monomers (e.g., 2-hydroxyl methacrylate); adducts between an unsaturated carboxylic acid and a monoepoxy compound; adducts between glycidyl (meth) acrylates (preferably methacrylate) and a monobasic acid (e.g., acetic acid, propionic acid, p-t-butylbenzonic acid or a fatty acid); monoesters or diesters between an acid anhydride group-containing unsaturated compounds (e.g., maleic anhydride or iraconic anhydride) and a glycol (e.g. ethylene glycol, 1,6-hexanediol or neopentyl glycol); chlorine-, bromine-, fluorine-, and hydroxyl group containing monomers such as 3-chloro-2-hydroxylpropyl (meth)acrylate (preferably methacrylate) and the like; $C_{1-24}$ alkyl esters or cycloalkyl esters of (meth)acrylic acid (preferably methacrylic acid), such as methyl methacrylate, ethyl methacrylate, propyl methacrylate, isopropyl methacrylate, n-, sec-, or t-butyl methacrylate, hexyl methacrylate, 2-ethylhexyl methacrylate, octylmethacrylate, decyl methacrylate, lauryl methacrylate, stearyl methacrylate, cyclohexyl methacrylate and the like, $C_{2-18}$ alkoxyalkyl esters of (meth)acrylic acid (preferably methacrylic acid), such as methoxybutyl methacrylate, methoxyethyl methacrylate, ethoxyethyl methacrylate, ethoxybutyl methacrylate and the like; olefines or diene compounds such as ethylene, propylene, butylene, isobutene, isoprene, chloropropene, fluorine containing olefins, vinyl chloride, and the like; ring-containing unsaturated monomers such as styrene and o-, m-, p-substitution products thereof such as N,N-dimethylaminostyrene, aminostyrene, hydroxystyrene, t-butylstyrene, carboxystyrene and the like, a-methyl styrene, phenyl (meth)acryltes, nitro-containing alkyl (meth) acrylates such as N,N-dimethyl-aminoethyl methacrylate, N-t-butylaminoethyl methacrylate; 2-(dimethylamino)ethyl methacrylate, methyl chloride quaternized salt, and the like; polymerizable amides such as (meth)acrylamide, N-methyl (meth)acrylamide, 2-acryloamido-2-methyl-1-propanesulfonic acid, and the like; nitrogen-containing monomers such as 2-, 4-vinyl pyridines, 1-vinyl-2-pyrrolidone, (meth)acrylonitrile, and the like; glycidyl group-containing vinyl monomers such as glycidyl (meth) acrylates and the like, vinyl ethers, vinyl acetate, and cyclic monomers such as methyl 1,1-bicyclobutanecarboxylate. These monomers can be used singly or as admixture of two or more than two.

Vinyl terminated macromonomers, such as any of those which are defined in "Chemistry and Industry of Macromonomers" (Yamashita, Huthig & Wepf, New York 1993), can also be used in the present invention. The preferable macromonomers are those terminated with methacrylate groups. Examples of such macromonomers include, but are not limited to, poly(ethylene oxide) methacrylate, poly(styrene) methacrylate, poly(siloxane) methacrylate, poly((meth)acrylic acid) methacrylate, and poly(alkyloxazoline) methacrylate.

The above polymerizable monomer or monomers typically can be used in a total amount of generally from 3–20,000 moles, preferably 5–2,000 moles, more preferably 10–1,000 moles per mole of the organic halide or organic sulfur compound initiator. The molecular weight of polymers prepared in accordance with the process of the present invention can be controlled based on the ratio of molar concentration of monomer to that of organic halide or organic sulfur compound. The polymerization degree can be obtained from 2 to 200,000. The molecular weight distribution of resultant polymer (defined by the ratio of weight average molecular weight to number average molecular weight) obtained from processes of the present invention is generally from 1.01 to 30, mostly from 1.05 to 3.0, and more preferably less than 2.0.

In the present invention, polymers with various specifically desired structures and architectures can be purposely produced. In terms of topology, such structures and architectures may include: linear, star, comb, hyperbranched, dendritic, cyclic, network, and the like. In terms of sequence/composition distribution such structures and architectures may include: homopolymer, random copolymer, block copolymer, graft copolymer, gradient copolymer, tapered copolymer, periodic copolymer, alternating copolymer, and the like. Block copolymers, e.g., can be synthesized by sequential block copolymerization, or using pre-formed oligomer or polymer modified with the introduction of halide or sulfur containing moieties. Graft/comb copolymers can be obtained by such known methods as grafting from, grafting onto, and macromonomer technique. Star polymer can be made from either "core-first" or "arm-first" techniques. Dendrimer or hyperbranched polymer can be obtained by means of known $A_nB_m$ or $A_n+B_m$ approaches. Although the present invention provides a living polymerization process for vinyl monomers, thanks to the fact that the halide or sulfur containing moiety can be introduced into any pre-formed oligomer or polymer, the polymer obtained by present invention may also comprise segments or blocks derived from other types of monomers such as polyethers, polysiloxanes, polymamide, polyester, polysulfone, polycarbonate, and the like.

Various organic or inorganic functional groups can be introduced to the ends of formed polymer or copolymer. By definition, a functional group is a moiety attached to a molecule that performs a function in terms of the reactivity and/or the physical properties of the molecule bearing it. Example of functional groups include but not limited to: halogens (e.g., Cl, Br, I), hydroxyl (—OH) groups such as —CH$_2$OH, —C(CH$_3$)$_2$OH, —CH(OH)CH$_3$, phenol and the like, thiol (—SH) groups, aldehyde (—CHO) and ketone (>C=O) groups, amine (—NH$_2$) groups, carboxylic acid and salt (—COOM) (M is H, alkali metal or ammonium), sulfonic acid and salt (—SO$_3$M) (M is H, alkali metal or ammonium), amide (—CONH$_2$), crown and kryptand, substituted amine (—NR$_2$) (R is H or Cl$_{1-18}$ alkyl), —C≡CR', —CH=CHR' (R' is H or alkyl or aryl or alkaryl or aralkyl or combinations thereof), —COX (X is halogen), —CH$_2$N(SiR'$_3$)$_2$, —Si(OR')$_3$, —CN, —CH$_2$NHCHO, —B(OR)$_2$, —SO$_2$Cl, —N$_3$, —MgX. Functionalized polymer and copolymers including macromonomer prepared in accordance with the invention may be obtained by two ways: (a) one-pot synthesis using functionalized organic halide or organic sulfur compound initiator; (b) transformation of end groups of living or preformed polymer to a desirable functional group by known organic reactions.

Various polymerization technologies can be used to make the polymer, which include but are not limited to: bulk polymerization, solution polymerization, emulsion polymerization, suspension polymerization, dispersion polymerization, precipitation polymerization, template polymerization, micro-emulsion polymerization, polymerization under supercritical condition, and miniemulsion polymerization. Various solvents can be used in the polymerization. Examples of the solvents are but not limited to: water, aliphatic solvent, aromatic solvent, hetero-atom containing solvent, supercritical solvent (such as CO$_2$), and the like. The inventive process can be conducted at any temperature that can give rise to a reasonable polymerization rate while a living process prevails, typically between −80° C. and 280° C., preferably between 0° C. and 180° C., more preferably between 20° C. and 150° C., most preferably between 20° C. and 130° C. The inventive process can be conducted under a pressure from 0.1 to 50,000 kPa, preferably from 1 to 1,000 kPa. The addition order of various ingredients in according with the process of the invention can vary and generally do not affect the outcome of the "living" polymerization. Depending the expected molecular weight and other factors, polymerization time may vary from 10 seconds to 100 hours, preferably from 1 minute to 48 hrs, more preferably from 10 minutes to 24 hrs, most preferably from 30 minutes to 18 hrs.

Polymerization kinetics, the degree of the control of the living polymerization process, and the structures and architectures of the polymers resulting from the process of the invention may be affected by the following factors:

1. Experimental conditions such as polymerization temperature, polymerization pressure, polymerization time, solvent, concentration, and the like;
2. Monomer structure such as monomer polarity, monomer size, the ability to interact with catalyst, and the like;
3. Physical and chemical property of layered material particle such as chemical composition, size, the nature of counterion, the solubility in the polymerization medium, the space between layers in layered material, and the like;
4. Physical and chemical property of organic halide or sulfur compound such as chemical structure, size, and the like;
5. Physical and chemical property of other additives optionally added; and
6. Engineering factors such as mixing order, mixing efficiency, and the like.

Experimental designs and combinatorial approaches such as those developed at Symatrix and other corporations/institutes are very helpful in optimization of polymerization conditions and of initiating systems. These computation approaches may be used to lead to the best polymerization conditions and the best combination of a variety of ingredients in initiating systems for living polymerization in accordance with the invention for any particular monomer(s).

The prepared polymer can be used as directly obtained from the process, or may be further purified, isolated, and stored. In order to obtain pure polymer, the inorganic layered material particles can be removed from the system by filtration or other known methods. The inorganic particle can be recycled and used for further polymerization or other purposes. Purification and isolation may also involve removing residual monomer, solvent, and other catalyst. The purification and isolation process may vary. Examples of isolation of polymers include but not limited to precipitation, extraction, filtration, spraying dry, centrifugation, vaporization, and the like. Final polymer product can also be used without further isolation such as in the form of the latex or emulsion, however, and it is an advantage that the present invention may directly yield a nanocomposite comprising a polymer with well-defined structure and complex architecture and an inorganic particle by in-situ polymerization. Such in-situ polymerization may occur on the surface of the inorganic particle yielding an organic-inorganic hybrid, or inside the inter-gallery between layers in layered material yielding an intercalated or exfoliated nanocomposite.

Polymers prepared with the inventive process may be useful in a wide variety of industrial applications involving polymers and polymer-inorganic nano-composites. Examples of these applications include but are not limited to: adhesives, dispersants, surfactants, emulsifiers, elastomers, coating, painting, thermoplastic elastomers, diagnostic and supporters, engineering resins, ink components, lubricants, polymer blend components, paper additives, biomaterials, water treatment additives, cosmetics components, antistatic agents, food and beverage packaging materials, film, semi-conductor, super-conductor, photonics, sensors, release compounding agents in pharmaceuticals applications.

EXAMPLES

The present invention is hereinafter described more specially by way of examples.

Example 1

0.14 grams of iodoacetonitrile, 5 grams of methyl methacrylate, 5 grams of chlorobenzene, and 0.25 grams of an organoclay layered material (Cloisite® 15A from Southern Clay Products, Inc., montmorillonite modified with a quaternary ammonium salt) were weighed into air-free one neck round flask equipped with a magnetic stirring bar under ambient atmosphere. After purging the solution with inert nitrogen gas for 15 minutes, the flask was placed in a pre-heated oil bath at 90° C. for 20 hrs. An aliquot of polymer solution was picked out to determine the conversion by means of $^1$H NMR in $CDCl_3$. Polymer was recovered by precipitation from heptane and dried at 40° C. under vacuum overnight. The molecular weight/molecular weight distribution were measured by size exclusive chromatography (SEC) using PMMA as a calibration standard. The analysis results: Conversion: 85%; number-averaged molecular weight ($M_{n,SEC}$): 4,900; molecular weight distribution ($M_w/M_n$): 2.8; Calculated molecular weight based on the equation: $M_{n,cal}=W_{MMA}/[ICH_2CN]_o \times conv.=5,100$; initiator efficiency (f) based on $M_{n,cal}/M_{n,SEC}=1.03$.

Example 2 (Comparative)

Except without using Cloisite® 15A, all experimental conditions were the same as in example 1. The analysis results: Conversion: 37%; number-averaged molecular weight ($M_n$): 99,100; molecular weight distribution ($M_w/M_n$): 2.1; Calculated molecular weight based on the equation: $M_{n,cal}=2,220$; f=0.02. Comparison between examples 1 and 2 demonstrates that layered material Cloisite® 15A affords a controlled polymerization process, i.e., higher monomer conversion (85% against 37%) and controlled molecular weight (f=1.03 against 0.02).

Examples 3–6

A typical example is described as follows. All reagents including organic halide or sulfur compound initiator, inorganic layered material catalyst (except for comparison example 6), solvent, and methyl methacrylate monomer, were weighed into a three neck round flask equipped with a condenser and magnetic stirring bar under ambient atmosphere. After purging the solution with inert nitrogen gas for 15 minutes, the flask was placed in a pre-heated oil bath at 90° C. Polymer was recovered by precipitation from either methanol or heptane. An aliquot of polymer solution was picked out to determine the conversion by means of 1H NMR in $CDCl_3$. Polymer was recovered by precipitation from either methanol or heptane and dried at 40° C. under vacuum overnight. The molecular weight/molecular weight distribution were measured by size exclusive chromatography (SEC) using PMMA as a calibration standard.

TABLE 1

Polymerization of Methyl Methacrylate (MMA) in 1,3-dimethyltetrahydro-2(1H)pyrimidone (DMPU) at 90° C.

| Ex. | MMA (g) | Initiator (g) | Catalyst solution[a] (g) | Time (hrs) | Conv. % | $M_n$ (SEC) | $M_n$ (cal) | f | $M_w/M_n$ |
|---|---|---|---|---|---|---|---|---|---|
| 3 | 10 | $ICH_2CN$ (0.17) | 15A[b] (10) | 18 | 55 | 6,130 | 5500 | 0.9 | 1.68 |
| 4 | 5 | $ICH_2CN$ (0.09) | Na[c] (5) | 20 | 53 | 4,640 | 5500 | 1.2 | 1.89 |
| 5 | 10 | TETD[d] (0.3) | 15A (10) | 23 | 54 | 11,500 | 5400 | 0.5 | 1.91 |
| 6 (comp.) | 5 | — | Solvent only (5) | 25 | 27 | 101,000 | | | 2.21 |

[a]Dispersed solution with 5% inorganic layered material particle in 1,3-dimethyltetrahydro-2(1H)pyrimidone (DMPU), except for comparison example 6 which used only DMPU;
[b]Cloisite ® 15A, an organically modified clay, from Southern Clay Products, Inc.;
[c]Na$^+$Cloisite ®, a natural clay, from Southern Clay Products, Inc.;
[d]$(C_2H_5)_2NC(=S)—S—S—C(=S)N(C_2H_5)_2$ "tetraethylthiuram disulfide".

As seen from Table 1, polymerization of MMA in the presence of either a natural clay layered material or an organically modified one yields a polymer with predictable molecular weight based on the ratio of initial weight of monomer to initial mole concentration of initiator and narrower molecular weight distribution, in comparison with one in the absence of a layered material.

Examples 7–16

Polymerization procedure is similar to that in examples 3–6, except using potassium iodide and/or phase transfer catalyst tris(methoxy ethoxy)ethylamine as additives.

TABLE 2

Polymerization of Methyl Methacrylate (MMA)
in 1,3-dimethyltetrahydro-2(1H)pyrimidone (DMPU) at 90° C.

| Ex. | MMA (g) | Initiator (g) | Catalyst solution[a] (g) | KI (g) | Tris[b] (g) | Time (hrs) | Conv. % | $M_n$ (SEC) | $M_n$ (cal) | f | $M_w/M_n$ |
|---|---|---|---|---|---|---|---|---|---|---|---|
| 7 | 10 | EIBBr[c] (0.4) | 15A (20) | 0.3 | 1.3 | 22.5 | 80 | 5590 | 4000 | 0.72 | 1.72 |
| 8 | 10 | EIBBr (0.4) | 25A[d] (10) | 0.3 | 1.3 | 22.5 | 95 | 5870 | 4750 | 0.81 | 1.89 |
| 9[e] | 10 | 4-A[f] (0.72) | 15A (10) | 0.3 | 1.3 | 18 | 65 | 13300 | 6500 | 0.5 | 1.17 |
| 10 | 5 | EIBBr (0.1) | 15A (5) | 0.08 | 0.33 | 19.5 | 88 | 8370 | 8800 | 1.05 | 2.2 |
| 11 | 5 | EIBBr (0.2) | Na (5) | 0.15 | 0.65 | 19.5 | 90 | 5280 | 4500 | 0.85 | 1.91 |
| 12 | 5 | EIBBr (0.1) | 15A (5) | 0.15 | — | 19.5 | 62 | 6120 | 6200 | 1.01 | 1.91 |
| 13[e] | 5 | EIBBr (0.1) | S/15A[g] (5/.25) | 0.08 | 0.33 | 17 | 87 | 9380 | 8700 | 0.93 | 2.05 |
| 14[h] | 10 | EIBBr (0.4) | 15A (10) | — | — | 22.5 | 90 | 14,900 | 4,500 | 0.3 | 5.55 |
| 15[h] | 5 | EIBBr (0.2) | Na (5) | — | — | 17.5 | 75 | 67900 | 3,750 | 0.05 | 2.36 |
| 16[h] | 5 | EIBBr (0.2) | DMPU (5) | 0.15 | 0.65 | 19.5 | 94 | 59,300 | 4,700 | 0.08 | 2.56 |

[a]Dispersed solution with 5% inorganic layered material particle in 1,3-dimethyltetrahydro-2(1H) pyrimidone (DMPU), except for example 13, which uses DMPU and 15A weighted separately to the flask, and example 16, which used only DMPU;
[b]tris(methoxy ethoxy)ethylamine;
[c]$(CH_3)_2C(Br)COOC_2H_5$;
[d]5% Cloisite ® 25A, an organically modified clay, from Southern Clay Products, Inc.;
[e]polymerization temperature is 75° C.;
[f]$C(CH_2CH_2OC(O)CCl_3)_4$;
[g]5 grams DMPU and 0.25 grams 15A weighted separately to the flask;
[h]comparative example.

As seen from Table 2, while organic chloride or bromide was used as initiator, polymerization of MMA in the presence of either a natural clay or an organically modified clay combined with KI either in the presence or absence of tris(methoxy ethoxy)ethylamine yields a polymer with predictable molecular weight based on the ratio of initial weight of monomer to initial mole concentration of initiator and narrower molecular weight distribution, in comparison with ones in the absence of KI.

Examples 17–21

Polymerization procedure is similar to that in examples 3–6, except also using a transition metal salt, $FeBr_2$, as an additive and at different temperatures.

TABLE 3

| Ex. | Monomer (g) | Initiator (g) | Catalyst solution[a] (g) | $FeBr_2$ (g) | Temp (° C.) | Time (hrs) | Conv. % | $M_n$ (SEC) | $M_n$ (cal) | f | $M_w/M_n$ |
|---|---|---|---|---|---|---|---|---|---|---|---|
| 17 | MMA (5) | EIBBr (0.1) | Na (5) | 0.22 | 95 | 19.5 | 20 | 2290 | 2000 | 0.87 | 1.32 |
| 18 | MMA (27) | EIBBr (0.4) | 15A (22) | 0.43 | 75 | 18 | 35 | 4110 | 4725 | 1.15 | 1.39 |

TABLE 3-continued

| Ex. | Monomer (g) | Initiator (g) | Catalyst solution[a] (g) | FeBr$_2$ (g) | Temp (° C.) | Time (hrs) | Conv. % | M$_n$ (SEC) | M$_n$ (cal) | f | M$_w$/M$_n$ |
|---|---|---|---|---|---|---|---|---|---|---|---|
| 19 | MMA (27) | 4-A (1.4) | 15A (22) | 0.43 | 75 | 18 | 20 | 2310 | 2710 | 1.17 | 1.26 |
| 20 | TBA[b] (10) | 4-A (0.72) | 15A (10) | 0.22 | 90 | 23 | 63 | 5070 | 6300 | 1.24 | 1.55 |
| 21 | St[c] (10) | 4-A (0.72) | 15A (10) | 0.22 | 120 | 23 | 34 | 2370 | 3400 | 1.43 | 1.23 |

[a]Dispersed solution with 5% inorganic layered material particle in DMPU for examples 17–19, or in toluene for examples 20–21;
[b]tert-butyl acrylate;
[c]styrene.

As seen from Table 3, while organic chloride or bromide was used, polymerization of three vinyl monomers, MMA, tBA, St, in the presence of a transition metal species, FeBr$_2$, yields a polymer with predictable molecular weight based on the ratio of initial weight of monomer to initial mole concentration of initiator, and narrower molecular weight distribution, in comparison with one in the absence of FeBr$_2$.

The invention has been described in detail with particular reference to preferred embodiments thereof, but it is to be understood that variations and modifications can be effected within the spirit and scope of the invention.

What is claimed is:

1. A process for polymerization of vinyl monomers comprising polymerizing vinyl monomers in the presence of an initiating system comprising (i) an organic iodide, organic bromide, organic chloride, or an organic sulfur initiator compound, and (ii) a layered material catalyst, and wherein when the initiator compound comprises an organic bromide or organic chloride compound, the initiating system further comprises an iodide or sulfur containing salt compound or a transition metal salt.

2. The process of claim 1, wherein the initiator compound comprises ethyl 2-bromoisobutyrate, ethyl 2-iodoisobutyrate, diethyl 2-bromo-2-methylmalonate, diethyl 2-iodo-2-methylmalonate, 2-chloropropionitrile, 2-bromopropionitrile, 2-iodopropionitrile, 2-bromo-2-methylpropionic acid, 2-bromoisobutyrophone, ethyl trichloroacetate, 2-bromoisobutyryl bromide, 2-chloroisobutyryl chloride, α-bromo-α-methyl-γ-butyrolactone, p-toluenesulfonyl chloride and its substituted derivatives, 1,3-benzenedisulfonyl chloride, carbon tetrachloride, carbon tetrabromide, chloroacetonitrile, iodoacetonitrile, tribromoethanol, tribromoacetyl chloride, trichloroacetyl chloride, tribromoacetyl bromide, chloroform, 1-phenyl ethylchloride, 1-phenyl ethylbromide, 2-chloropropionic acid, 2-bromoisobutyric acid, 4-vinyl benzene sulfonyl chloride, vinyl benzenechloride, 2-chloroisobutyrophenone, or 2-bromoisobutyrophenone.

3. The process of claim 1, wherein the initiator compound comprises an organic iodide compound.

4. The process of claim 1, wherein the initiator compound comprises an organic sulfur compound.

5. The process of claim 4, wherein the organic sulfur compound comprises a compound of the following formulae I, II, III or IV:

 R$^1$—S—R$^2$ (I)

 R$^1$—S—S—R$^2$ (II)

 R$^1$—C(=S)—S—R$^2$ (III)

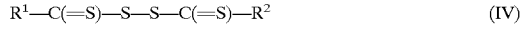 R$^1$—C(=S)—S—S—C(=S)—R$^2$ (IV)

where R$^1$ and R$^2$ are independently selected from the following group: substituted or non-substituted alkyl, substituted or non-substituted aryl, substituted or non-substituted cycloalkyl, hetero-atom containing substituted or non-substituted alkyl, hetero-atom containing substituted or non-substituted aryl, hetero-atom containing substituted or non-substituted cycloalkyl, NR$^3$R$^4$, SR$^5$, OR$^6$, C(O)R$^7$, or C(O)OR$^8$, where R$^3$, R$^4$, R$^5$, R$^6$, R$^7$ and R$^8$ are substituted or non-substituted alkyl, substituted or non-substituted aryl, substituted or non-substituted cycloalkyl, hetero-atom containing substituted or non-substituted alkyl, hetero-atom containing substituted or non-substituted aryl, or hetero-atom containing substituted or non-substituted cycloalkyl.

6. The process of claim 4, wherein the organic sulfur compound comprises tetraethylthiuram disulfide, s-phenyl thioacetate, (CH$_3$)$_2$C(SPh)COOC$_2$H$_5$, (CH$_3$)$_2$C(SC(=S)OC$_2$H$_5$)COOC$_2$H$_5$, or (CH$_3$)$_2$C(SC(=S)N(C$_2$H$_5$)$_2$)COOC$_2$H$_5$.

7. The process of claim 1, wherein the initiating system comprises an organic bromide or an organic chloride compound, and an iodide or sulfur containing salt compound.

8. The process of claim 7, wherein the iodide or sulfur containing salt comprises NaI, KI, LiI, CsI, CaI$_2$, Na[SC(=S)N(C$_2$H$_5$)$_2$], K[SC(=S)OC$_2$H$_5$], or K[S—C$_6$H$_5$].

9. The process of claim 7, wherein the initiating system comprises an organic bromide or an organic chloride compound, and an iodide containing salt compound.

10. The process of claim 7, wherein the initiating system further comprises a phase transfer agent.

11. The process of claim 10, wherein the phase transfer agent comprises an onium salt or a chelating agent.

12. The process of claim 1, wherein the initiating system comprises an organic bromide or an organic chloride compound, and a transition metal salt.

13. The process of claim 12, wherein the transition metal salt is of the formula MY, where M is a transition metal atom with a formal charge of from 0–7, and Y is one or more counter-anion or coordinative ligand.

14. The process of claim 1, wherein the layered material catalyst comprises a phyllosilicate.

15. The process of claim 1, wherein the layered material catalyst comprises a montmorillonite, hectorite, or hydrotalcite.

16. The process of claim 1, wherein the layered material catalyst comprises an organoclay material.

17. The process of claim 16, wherein the layered material catalyst comprises an onium ion modified organoclay.

18. The process of claim 1, wherein the monomers are used in a total amount of from 3–20,000 moles per mole of the organic iodide, organic bromide, organic chloride, or organic sulfur initiator compound.

* * * * *